US011277164B2

(12) United States Patent
Nakayama et al.

(10) Patent No.: US 11,277,164 B2
(45) Date of Patent: Mar. 15, 2022

(54) AMPLIFIER MODULE

(71) Applicant: Alps Alpine Co., Ltd., Tokyo (JP)

(72) Inventors: Eita Nakayama, Miyagi-ken (JP);
Kazushi Kofune, Miyagi-ken (JP);
Mutsumi Yoshida, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/194,572

(22) Filed: Mar. 8, 2021

(65) Prior Publication Data
US 2021/0194527 A1 Jun. 24, 2021

Related U.S. Application Data

(63) Continuation of application No. PCT/JP2019/009532, filed on Mar. 8, 2019.

(30) Foreign Application Priority Data

Sep. 18, 2018 (JP) .............................. JP2018-173998

(51) Int. Cl.
*H04B 1/3822* (2015.01)
*H01Q 1/22* (2006.01)
(Continued)

(52) U.S. Cl.
CPC .............. *H04B 1/3822* (2013.01); *H01Q 1/22* (2013.01); *H04B 1/0458* (2013.01); *H04B 1/18* (2013.01);
(Continued)

(58) Field of Classification Search
CPC ...... H04B 1/3822; H04B 1/0458; H04B 1/18; H04B 1/40; H04B 2001/0408; H01Q 1/22
(Continued)

(56) References Cited

U.S. PATENT DOCUMENTS

2002/0137536 A1   9/2002  Aisaka et al.
2008/0218638 A1   9/2008  Kuroyanagi et al.
(Continued)

FOREIGN PATENT DOCUMENTS

EP   1699109      9/2006
JP   H09-186626   7/1997
(Continued)

OTHER PUBLICATIONS

International Search Report from corresponding International Application No. PCT/JP2019/009532, dated May 1, 2019, 13pp.

*Primary Examiner* — Lee Nguyen
(74) *Attorney, Agent, or Firm* — Crowell & Moring LLP

(57) ABSTRACT

An amplifier module is disposed between a wireless communication antenna and a body unit of a wireless communication apparatus and connected to the antenna and the body unit through a wiring member. The amplifier module includes an antenna-side terminal connected to the antenna, a body-side terminal connected to the body unit, an amplification circuit disposed between the antenna-side terminal and the body-side terminal, an antenna detection circuit configured to detect electric characteristics of the antenna-side terminal, and a characteristic variable circuit configured to change electric characteristics of the body-side terminal based on the electric characteristics of the antenna-side terminal detected by the antenna detection circuit.

16 Claims, 4 Drawing Sheets

(51) Int. Cl.
  *H04B 1/04* (2006.01)
  *H04B 1/18* (2006.01)
  *H04B 1/40* (2015.01)

(52) U.S. Cl.
  CPC ....... *H04B 1/40* (2013.01); *H04B 2001/0408* (2013.01)

(58) Field of Classification Search
  USPC ..................................................... 455/73–84
  See application file for complete search history.

(56) References Cited

U.S. PATENT DOCUMENTS

| | | |
|---|---|---|
| 2008/0218639 A1 | 9/2008 | Kuroyanagi et al. |
| 2010/0291915 A1* | 11/2010 | Nast ....................... H04B 1/406 455/422.1 |
| 2015/0065067 A1 | 3/2015 | Sugimoto et al. |
| 2015/0212141 A1 | 7/2015 | Maruyama |

FOREIGN PATENT DOCUMENTS

| | | |
|---|---|---|
| JP | 2001-068956 | 3/2001 |
| JP | 2002-290262 | 10/2002 |
| JP | 2006-222746 | 8/2006 |
| JP | 2008-219540 | 9/2008 |
| JP | 2008-219543 | 9/2008 |
| JP | 2010-010841 | 1/2010 |
| JP | 2010-139308 | 6/2010 |
| JP | 2010-232927 | 10/2010 |
| JP | 2015-046789 | 3/2015 |
| JP | 2015-142278 | 8/2015 |
| JP | 2016-086410 | 5/2016 |

\* cited by examiner

AMPLIFIER MODULE

CLAIM OF PRIORITY

This application is a Continuation of International Application No. PCT/JP2019/009532 filed on Mar. 8, 2019, which claims benefit of priority to Japanese Patent Application No. 2018-173998 filed on Sep. 18, 2018. The entire contents of each application noted above are hereby incorporated by reference.

BACKGROUND

1. Field of the Disclosure

The present disclosure relates to an amplifier module.

2. Description of the Related Art

In general, wireless communication apparatuses for vehicles include a wireless communication antenna, a body unit of the wireless communication apparatus disposed in a position physically separated from the antenna, and a communication cable that connects the antenna and the body unit to each other (refer to Japanese Unexamined Patent Application Publication No. 2015-046789, for example).

When a communication cable between an antenna and a body unit of the wireless communication apparatuses is long, the communication characteristics of general wireless communication apparatuses are degraded due to an increase in signal loss.

To compensate such a signal loss, an amplifier module including a transmission amplifier serving as a transmission amplification circuit and a reception amplifier serving as a reception amplification circuit may be disposed between an antenna and a body unit.

However, when the amplifier module is disposed between the antenna and the body unit while the body unit has a function of detecting an antenna connection state based on impedance, a current value, or the like, the body unit may not appropriately detect an antenna connection state due to influence of circuits included in the amplifier module.

SUMMARY

An amplifier module according to an embodiment of the present invention is disposed between a wireless communication antenna and a body unit of a wireless communication apparatus and that is connected to the antenna and the body unit through a wiring member. The amplifier module includes an antenna-side terminal connected to the antenna, a body-side terminal connected to the body unit, an amplification circuit disposed between the antenna-side terminal and the body-side terminal, an antenna detection circuit configured to detect electric characteristics of the antenna-side terminal, and a characteristic variable circuit. The variable circuit is configured to change electric characteristics of the body-side terminal based on the electric characteristics of the antenna-side terminal detected by the antenna detection circuit.

An amplifier module that is disposed between the wireless communication antenna and the body unit of the wireless communication apparatus and that allows the body unit of the wireless communication apparatus to detect an antenna connection state may be provided.

DESCRIPTION OF THE EXEMPLARY EMBODIMENTS

Hereinafter, embodiments of an amplifier module according to the present invention will be described.

Figure 1:
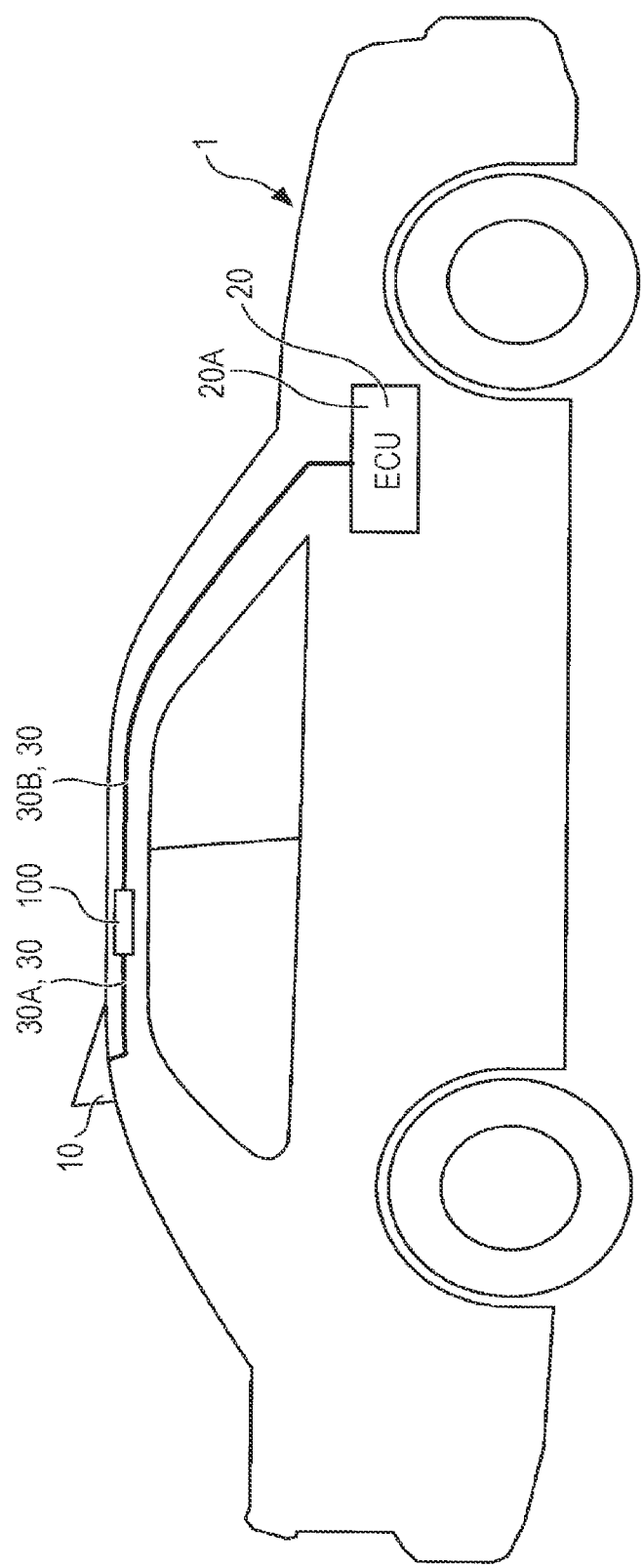
FIG. 1 is a diagram illustrating an example of arrangement of an amplifier module according to an embodiment.

FIG. 1 is a diagram illustrating an example of arrangement of an amplifier module 100 according to an embodiment. A vehicle 1 includes a wireless communication antenna 10, a body unit 20 of a wireless communication apparatus, a communication cable 30, and an amplifier module 100. Note that, although the vehicle 1 is typically a car, a vehicle of any form may be employed. Furthermore, although the antenna 10 is for V2X communication (a general term of inter-vehicle communication and road-to-vehicle communication) disposed in a rear end of a roof of the vehicle 1, the antenna 10 is not limited to this type. The cable 30 includes a cable 30A connecting the antenna 10 and the amplifier module 100 to each other and a cable 30B connecting the amplifier module 100 and the body unit 20.

The body unit 20 provides the main function of the wireless communication apparatus and constitutes the wireless communication apparatus with the antenna 10, the cable 30, and the amplifier module 100. The body unit 20 may be a navigation electronic control unit (ECU) having a wireless communication function, for example, and is preferably disposed near a dashboard of the vehicle 1. The antenna 10 is connected to the amplifier module 100 through the cable 30A, and the amplifier module 100 is connected to the body unit 20 through the cable 30B.

The body unit 20 includes a terminal 20A connected to the cable 30B. When the amplifier module 100 is not used, the terminal 20A is connected to the antenna 10 through a single cable similar to the cable 30A and the cable 30B. The body unit 20 determines a state of connection of the antenna 10 to the terminal 20A based on electric characteristics (including impedance and a current value) when the amplifier module 100 is not used.

Examples of the state of connection of the antenna 10 to the terminal 20A include a state in which the antenna 10 is normally connected to the terminal 20A through a cable without an error, such as short-circuit of the cable, (normal connection state), a state in which the antenna 10 or the cable is not connected to the terminal 20A and the terminal 20A is opened (non-connection state), and a state in which the terminal 20A and a ground potential point (reference potential point) are short-circuited since a type of connected antenna is different from that of the antenna 10 to be connected, for example.

The cable 30 is an example of a wiring member. Although a coaxial cable or the like is used as the cable 30 taking influence of electromagnetic wave noise or the like into consideration, the cable 30 is not limited to this type.

The cable 30A passes a back side of the roof of the vehicle 1, and the cable 30B passes an interior of a pillar A of the vehicle 1 and the back side of the roof. The cable 30A and the cable 30B have a FAKRA plug and the antenna 10, the body unit 20, and the amplifier module 100 have a FAKRA jack, for example, and therefore, insertion and separation may be easily performed.

The amplifier module 100 is disposed on the back side of the roof of the vehicle 1, for example. The amplifier module 100 is at least disposed between (midway between) the antenna 10 and the body unit 20, or may be disposed in a position at a middle point between the antenna 10 and the body unit 20 where a length of the cable 30A and a length of the cable 30B are equal to each other. When the lengths of the cables 30A and 30B are equal to each other, the amplifier module 100 is disposed in a middle point of the length of the cable 30. This arrangement is preferable, particularly when a loss of a transmission signal and a loss of a reception signal are to be compensated for with balance.

Furthermore, it is not necessarily the case that the amplifier module 100 is disposed at the middle point of the length of the cable 30, and the amplifier module 100 may be disposed on an inner side of an pillar A in a position where the cable 30B is shorter than the cable 30A.

Conversely, the cable 30A may be shorter than the cable 30B. In this case, in a path between the antenna 10 and the body unit 20 where the cable 30 is disposed, the amplifier module 100 may be disposed in a position nearer the antenna 10 relative to a point in which a distance from the antenna 10 and a distance from the body unit 20 are equal to each other, and a signal level may be compensated for in the position near the antenna 10. In general, a reception signal has a signal level lower than that of a transmission signal and is easily affected by electromagnetic wave noise or the like. Therefore, the amplifier module 100 is disposed near the antenna 10 so that influence of the electromagnetic wave noise on the reception signal is easily suppressed. Accordingly, this arrangement is suitably employed particularly when suppression of influence of electromagnetic wave noise or the like on a reception signal is preferentially performed rather than balanced compensation of a loss of a transmission signal and a loss of a reception signal.

The amplifier module 100 changes electric characteristics (including impedance and a current value) of a body-side terminal 102 in accordance with a state of connection of the antenna 10 to an antenna-side terminal 101 of the amplifier module 100 in a state in which the amplifier module 100 is connected to the body unit 20 through the cable 30B similarly to a case where the amplifier module 100 is not used.

Examples of the state of the connection of the antenna 10 to the antenna-side terminal 101 include a state in which the antenna 10 is normally connected to the antenna-side terminal 101 through the cable 30A without an error, such as short-circuit of the cable, (normal connection state), a state in which the antenna 10 and the cable 30A are not connected to the antenna-side terminal 101 and the antenna-side terminal 101 is opened (non-connection state), and a state in which the antenna-side terminal 101 and a ground potential point are short-circuited (short-circuited state) since a type of antenna different from the antenna 10 to be connected is connected, for example.

Since the electric characteristics of the body-side terminal 102 are changed similarly to the case where the amplifier module 100 is not used, the body unit 20 may determine a connection state (the normal connection state, the non-connection state, or the short-circuited state) of the antenna 10 based on the electric characteristics of the body-side terminal 102 of the amplifier module 100 similarly to the case where the amplifier module 100 is not used. Hereinafter, a function of the amplifier module 100 described above will be described.

Figure 2:
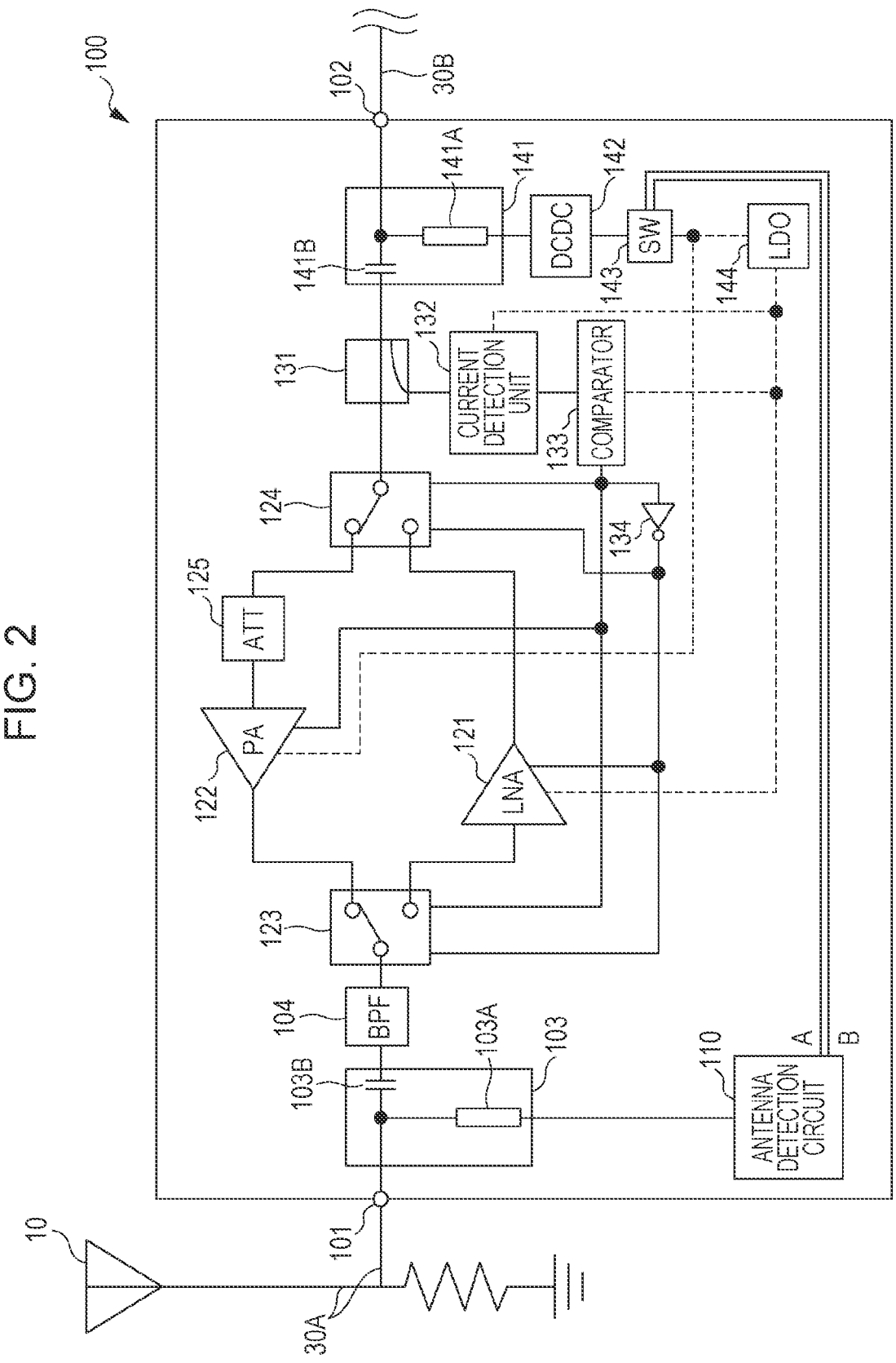
FIG. 2 is a diagram illustrating a configuration of the amplifier module.

FIG. 2 is a diagram illustrating a configuration of the amplifier module 100. The amplifier module 100 includes the antenna-side terminal 101, the body-side terminal 102, a branch circuit 103, a band pass filter (BPF) 104, an antenna detection circuit 110, a low noise amplifier (LNA) 121, a power amplifier (PA) 122, switch (SW) circuits 123 and 124, and an attenuator (ATT) 125.

The amplifier module 100 further includes a directional coupler 131, a signal detection circuit (DET: Detector) 132, a comparator (COMP) 133, an inverter 134, a branch circuit 141, a direct current direct current (DCDC) converter 142, a switch circuit 143, and a low dropout (LDO) 144.

The antenna-side terminal 101 is an FAKRA jack, for example, and an FAKRA plug of the cable 30A connected to the antenna 10 is inserted to the antenna-side terminal 101 for connection. The BPF 104 and the antenna detection circuit 110 are connected to the antenna-side terminal 101 through the branch circuit 103.

The body-side terminal 102 is an FAKRA jack, for example, and an FAKRA plug of the cable 30B connected to the body unit 20 (refer to FIG. 1) is inserted to the body-side terminal 102 for connection. The body-side terminal 102 is connected to the directional coupler 131 and the DCDC converter 142 through the branch circuit 141.

The branch circuit 103 includes an inductor 103A and a capacitor 103B. The branch circuit 103 has a line path branched in a T shape between the antenna-side terminal 101 and the BPF 104. The inductor 103A is inserted into a branched line in series so as to be connected to the antenna detection circuit 110. The capacitor 103B is inserted into a portion between the branch point and the BPF 104 in series.

In this way, a reception signal of an AC component is transmitted to the BPF 104, and a DC component is transmitted to the antenna detection circuit 110 among electric signals supplied from the antenna-side terminal 101. Furthermore, a DC component of an electric signal supplied from the antenna detection circuit 110 is transmitted to the antenna-side terminal 101, and a transmission signal of an AC component of the electric signal supplied from the BPF 104 is transmitted to the antenna-side terminal 101.

The BPF 104 is disposed between the capacitor 103B of the branch circuit 103 and the switch circuit 123 and is a band-pass filter that allows only transmission signals or reception signals in a predetermined band to pass.

The antenna detection circuit 110 is connected to the antenna-side terminal 101 through the inductor 103A of the branch circuit 103. The antenna detection circuit 110 is a current monitor using an integrated circuit (IC), for example. The antenna detection circuit 110 outputs a voltage to the inductor 103A and detects a value of current to be supplied to the inductor 103A. The value of the current supplied to the inductor 103A indicates a current value in the antenna-side terminal 101.

Furthermore, the antenna detection circuit 110 has an internal memory storing data on a current value corresponding to the normal connection state, data on a current value corresponding to the non-connection state, and data on a current value corresponding to the short-circuited state, for example.

Specifically, in the case of FIG. 2, a resistor is connected between the antenna 10 and a ground potential point, and a predetermined current is supplied to the resistor in the normal connection state. Accordingly, a current value in the antenna-side terminal 101 is a predetermined value corresponding to a resistance value of the resistor. On the other hand, since the antenna-side terminal 101 is in an open state in the non-connection state, a current value in the antenna-side terminal 101 is smaller than a current value in the normal connection state (approximately zero). Furthermore, since the antenna-side terminal 101 is short-circuited with the ground potential point in the short-circuited state, the current value in the antenna-side terminal 101 is larger than the current value in the normal connection state.

Specifically, in the amplifier module 100 configured as described above, a current value in the antenna-side terminal 101 in the non-connection state is smallest, a current value in the antenna-side terminal 101 in the normal connection state is second smallest, and a current value in the antenna-side terminal 101 in the short-circuited state is largest. This fact means that, in terms of impedance, impedance of the antenna-side terminal 101 in the non-connection state is largest, impedance in the antenna-side terminal 101 in the normal connection state is second highest, and impedance in the antenna-side terminal 101 in the short-circuited state is lowest.

Then the antenna detection circuit 110 not only detects a current value in the antenna-side terminal 101 but also outputs two signals A and B corresponding to a detected current value.

Specifically, when detecting a current value in the normal connection state, the antenna detection circuit 110 outputs a signal A of an H level (high potential) and a signal B of an L level (low potential) to the switch circuit 143. Furthermore, when detecting a current value in the non-connection state, the antenna detection circuit 110 outputs a signal A of an L level and a signal B of an L level to the switch circuit 143. Furthermore, when detecting a current value in the short-circuited state, the antenna detection circuit 110 outputs a signal A of an L level and a signal B of an H level to the switch circuit 143.

Note that the detection of a current value in the antenna-side terminal 101 performed by the antenna detection circuit 110 may be recognized as a detection of impedance of the antenna-side terminal 101. Therefore, the antenna detection circuit 110 serves as not only a current detection circuit detecting a current value in the antenna-side terminal 101 but also an impedance detection circuit detecting impedance (a DC resistance value, in particular) of the antenna-side terminal 101.

Furthermore, in terms of suppression of overcurrent, the antenna detection circuit 110 preferably includes a current restriction circuit capable of restricting current supplied to the inductor 103A from the antenna detection circuit 110 in the short-circuited state.

A current value and impedance in the antenna-side terminal 101 are examples of electric characteristics of the antenna-side terminal 101. Furthermore, the current detection circuit and the impedance detection circuit are examples of the antenna detection circuit detecting the electric characteristics of the antenna-side terminal 101.

The LNA 121 connected in parallel to the PA 122 and the attenuator 125 between the switch circuits 123 and 124 amplifies a reception signal supplied from the antenna 10 through the switch circuit 123 and outputs the amplified signal to the switch circuit 124. The LNA 121 is an example of a reception amplifier.

The PA 122 is connected to the attenuator 125 in series between the switch circuits 123 and 124. The PA 122 and the attenuator 125 are connected in parallel to the LNA 121 between the switch circuits 123 and 124. The PA 122 amplifies a transmission signal supplied through the attenuator 125 and outputs the amplified signal to the switch circuit 123. The PA 122 is an example of a transmission amplifier.

The switch circuit 123 has three terminals, and the three terminals are individually connected to the BPF 104, an input terminal of the LNA 121, and an output terminal of the PA 122. Examples of the switch circuit 123 include a single-pole double-throw (SPDT) switch.

The switch circuit 123 switches a connection direction of the BPF 104 to the input terminal of the LNA 121 or the output terminal of the PA 122 in accordance with a switch signal output from the comparator 133.

The switch circuit 124 has three terminals similarly to the switch circuit 123, and the three terminals are individually connected to the directional coupler 131, the output terminal of the LNA 121, and the input terminal of the PA 122 (through the attenuator 125 to the input terminal of the PA 122). Similarl to the switch circuit 123, examples of the switch circuit 124 include an SPDT switch.

The switch circuit 124 switches a connection direction of the directional coupler 131 to the output terminal of the LNA 121 or the input terminal of the PA 122 in accordance with a switch signal output from the comparator 133.

The attenuator 125 connected to the PA 122 in series attenuate a signal level of a transmission signal to a predetermined appropriate level and outputs the attenuated signal to the PA 122.

The directional coupler 131 is a unidirectional coupler having three terminals. The three terminals are individually connected to the switch circuit 124, the signal detection circuit 132, and a branch point of the branch circuit 141. The directional coupler 131 extracts a portion of a transmission signal supplied through the branch circuit 141 and outputs the portion of the transmission signal to the signal detection circuit 132, but outputs a reception signal to the branch circuit 141 without extracting the reception signal supplied from the switch circuit 124. A proportion (a degree of coupling) of a signal output from the directional coupler 131 to the signal detection circuit 132 is set as a predetermined value. A transmission state and a reception state may be easily detected using the directional coupler 131 configured as described above.

The signal detection circuit 132 is disposed between the directional coupler 131 and the comparator 133. The signal detection circuit 132 is a power detector using an integrated circuit (IC), for example. The signal detection circuit 132 outputs, to the comparator 133, a signal having a voltage corresponding to an electric power of a signal (a portion of a transmission signal) supplied through the directional coupler 131.

The comparator 133 compares two potentials. The comparator 133 has one input terminal connected to an output terminal of the signal detection circuit 132. The comparator 133 has the other input terminal connected to an output terminal of the LDO 144 through a line indicated by a dotted line. Furthermore, the comparator 133 has an output terminal outputting a signal indicating a comparison result. The output terminal is connected to a signal input terminal of the PA 122 that receives a switch signal for performing switching between an ON state and an Off state of the PA 122 and one of two signal input terminals of each of the switch circuits 123 and 124 that receive a switch signal for performing switching of connection destinations.

An input terminal of the inverter 134 is also connected to the output terminal of the comparator 133. The inverter 134 has an output terminal connected to a signal input terminal of the LNA121 that receives a switch signal for performing switching between an ON state and an Off state of the LNA 121 and the other of the two signal input terminals of each of the switch circuits 123 and 124 that receive a switch signal, and a switch signal output from the comparator 133 is supplied after being inverted by the inverter 134.

Then the comparator 133 compares a voltage supplied from the signal detection circuit 132 with a predetermined threshold value (an output voltage of the LDO 144) and outputs a switch signal indicating a result of the comparison to the LNA 121, the PA 122, and the switch circuits 123 and 124. The comparator 133 is an example of a switch signal output unit.

The comparator 133 outputs a switch signal of an H level when a voltage supplied from the signal detection circuit 132 is equal to or higher than the predetermined threshold value (when a transmission signal is supplied from the body-side terminal 102), and outputs a switch signal of an L level when a voltage is lower than the threshold value (when a transmission signal is not supplied from the body-side terminal 102).

When the comparator 133 outputs a switch signal of an H level, the LNA 121 is turned off and the PA 122 is turned on so that the switch circuits 123 and 124 are connected to the PA 122 and the attenuator 125. A mode for amplifying a transmission signal is entered by this, and the switch circuits 123 and 124 are brought into a transmission connection state.

Furthermore, when the comparator 133 outputs a switch signal of an L level, the LNA 121 is turned on and the PA 122 is turned off so that the switch circuits 123 and 124 are connected to the LNA 121. A mode for amplifying a reception signal is entered by this, and the switch circuits 123 and 124 are brought into a reception connection state.

Note that the LNA 121 and the PA 122 may be efficiently operated by switching the switch circuits 123 and 124 using the signal detection circuit 132 and the comparator 133.

The switch circuits 123 and 124 are examples of a transmission/reception switch circuit that performs switching between a transmission connection state in which the PA 122 serving as a transmission amplifier is connected between the antenna-side terminal 101 and the body-side terminal 102 at a time of signal transmission and a reception connection state in which the LNA 121 serving as a reception amplifier is connected between the antenna-side terminal 101 and the body-side terminal 102 at a time of signal reception.

The branch circuit 141 includes an inductor 141A and a capacitor 141B. The branch circuit 141 has a line path branched in a T shape between the body-side terminal 102 and directional coupler 131. The inductor 141A is inserted into a branch line in series and connected to the DCDC converter 142. The capacitor 141B is inserted into a portion between a branch point and the directional coupler 131 in series.

In this way, a transmission signal of an AC component is transmitted to the directional coupler 131, and a DC component is transmitted to the DCDC converter 142 among electric signals supplied from the body-side terminal 102. Furthermore, a reception signal of an AC component of an electric signal is transmitted from the directional coupler 131 to the body-side terminal 102.

The DCDC converter 142 is connected between the inductor 141A of the branch circuit 141 and the switch circuit 143. A DC electric signal superposed on a transmission signal is supplied to the DCDC converter 142 through the inductor 141A of the branch circuit 141, and the input electric signal is output to the switch circuit 143 after being converted to have a predetermined voltage.

Figure 3A:
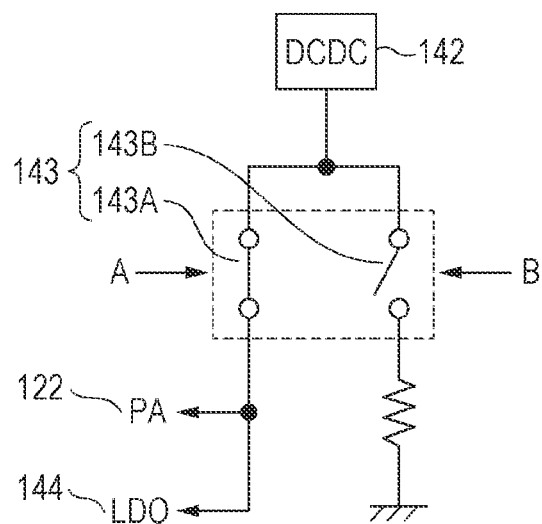
FIGS. 3A to 3C are diagrams illustrating a configuration of a switch circuit.
Figure 3B:
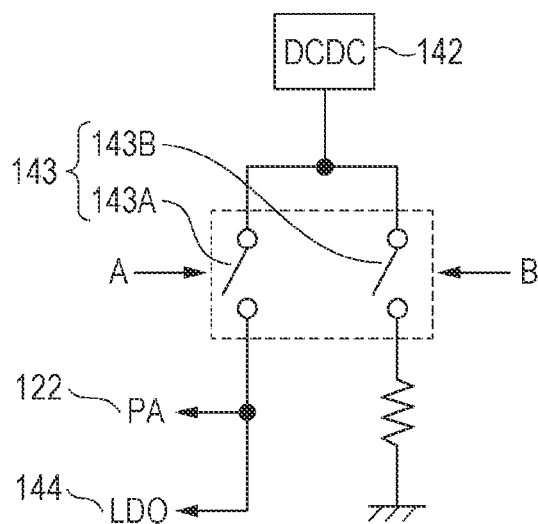
Figure 3C:
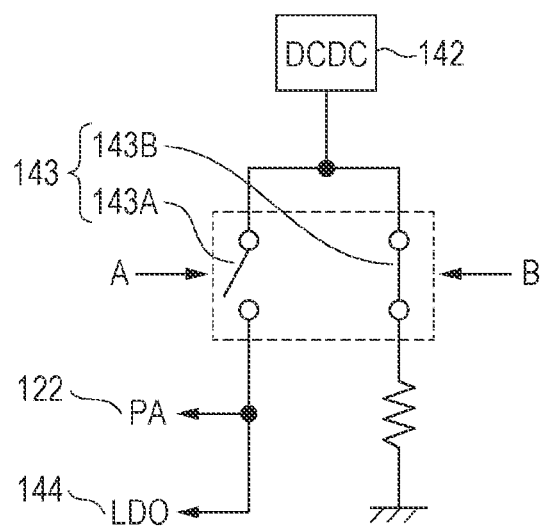

The switch circuit 143 is connected to the antenna detection circuit 110, the DCDC converter 142, the PA 122, and the LDO 144 and has two switches. The switch circuit 143 will be described with reference to FIGS. 3A to 3C in addition to FIG. 2. FIGS. 3A to 3C are diagrams illustrating a configuration of the switch circuit 143. The switch circuit 143 includes a switch element 143A and 143B.

The switch element 143A and 143B are disposed in parallel to each other, and the switch element 143A is disposed between the DCDC converter 142 on one side and the PA 122 and the LDO 144 on the other side. The switch element 143B is connected between the DCDC converter 142 and the ground potential point through a resistor.

The switch elements 143A and 143B are turned on or off in response to signals A and B, respectively, output from the antenna detection circuit 110. The switch elements 143A and 143B are turned on (closed) when the signals A and B are in an H level, respectively, and turned off (opened) when the signals A and B are in an L level, respectively.

In a state in which the antenna 10 is normally connected to the antenna-side terminal 101 through the cable 30A (in the normal connection state), the switch element 143A is turned on and the switch element 143B is turned off in accordance with the signal A of an H level and the signal B of an L level, respectively, as illustrated in FIG. 3A. Accordingly, electric power output from the DCDC converter 142 is supplied to the PA 122, and electric power subjected to voltage conversion performed by the LDO 144 is supplied to the LNA 121, the signal detection circuit 132, and the comparator 133.

Furthermore, in a state in which the antenna 10 and the cable 30A are not connected to the antenna-side terminal 101 (in the non-connection state), the switch elements 143A and 143B are turned off in response to the signal A and signal B in an L level, respectively, as illustrated in FIG. 3B, and electric power is not supplied to the PA 122, the LNA 121, the signal detection circuit 132, or the comparator 133.

In a state of short-circuit between the antenna-side terminal 101 and the ground potential point (in the short-circuited state), the switch element 143A is turned off and the switch element 143B is turned on in response to the signal A of an L level and the signal B of an H level, respectively, as illustrated in FIG. 3C. Accordingly, current output from the DCDC converter 142 is supplied to the ground potential point through the switch element 143B. A resistance value of the resistor connected in series to the switch element 143B is set such that current supplied to the connection potential point through the switch element 143B is larger than current supplied from the body-side terminal 102 to the various circuits including the PA 122, the LNA 121, the signal detection circuit 132, and the comparator 133 in the normal connection state. Note that the resistor is preferably a current restriction element configured such that current of a predetermined upper limit value or more is not supplied in terms of suppression of overcurrent.

As described above, when the switch elements 143A and 143B included in the switch circuit 143 are switched from one to another, a value of current supplied from the body unit 20 to the body-side terminal 102, that is, a value of current in the body-side terminal 102, is restricted. This restriction means that impedance of the body-side terminal 102 viewed from the body unit 20 is changed when the switching is performed between the switch elements 143A and 143B of the switch circuit 143 in terms of impedance.

Specifically, in the amplifier module 100 configured as described above, a current value in the body-side terminal 102 in the non-connection state is smallest, a current value in the body-side terminal 102 in the normal connection state is second smallest, and a current value in the body-side terminal 102 in the short-circuited state is largest. This tendency is the same as that of the current values in the antenna-side terminal 101 in the normal connection state, the non-connection state, and the short-circuited state.

Furthermore, according to the amplifier module 100 of this configuration, impedance of the body-side terminal 102 in the non-connection state is largest, impedance in the body-side terminal 102 in the normal connection state is second highest, and impedance in the body-side terminal 102 in the short-circuited state is lowest. This tendency is the same as that of the impedance in the antenna-side terminal 101 in the normal connection state, the non-connection state, and the short-circuited state.

The switch circuit 143 configured as described above is a current restriction circuit restricting a current value in the body-side terminal 102 based on a current value of the antenna-side terminal 101 detected by the antenna detection circuit 110, and also an impedance variable circuit that changes the impedance of the body-side terminal 102 based on the impedance of the antenna-side terminal 101 detected by the antenna detection circuit 110.

The LDO 144 is disposed between the switch element 143A of the switch circuit 143 on one side and the LNA 121, the signal detection circuit 132, and a power source terminal of the comparator 133 on the other side, and outputs a voltage of electric power output from the DCDC converter 142 after stepping down the voltage to voltages corresponding to the LNA 121, the signal detection circuit 132, and the comparator 133. The LDO 144 is a low-loss linear regulator or a low-saturated linear regulator.

Note that, in this embodiment, the LNA 121 and the PA 122 may be recognized as an amplification circuit in a narrow definition of the amplification module, or the LNA 121, the PA 122, the switch circuits 123 and 124, the attenuator 125, and the comparator 133 may be collectively recognized as an amplification circuit in a broad definition. Furthermore, an entire configuration of the amplifier module 100 may be simplified when such an amplification circuit is used.

Furthermore, the switch circuits 123 and 124 are examples of a transmission/reception switch circuit. The comparator 133 is an example of a switch signal output unit outputting a switch signal for performing switching between the transmission connection state and the reception connection state of the switch circuits 123 and 124.

Note that, although the switch circuits 123 and 124 perform switching between the transmission connection state and the reception connection state using two switch signals, the switching may be performed using one switch signal. Furthermore, the transmission/reception switch circuit may be configured using a switch circuit having another configuration.

Furthermore, the switch circuit 143 is an example of a characteristic variable circuit, and the switch elements 143A and 143B are examples of a first switch element and a second switch element, respectively.

Note that, although a current value and impedance in the body-side terminal 102 are changed using the switch circuit in the characteristic variable circuit of this embodiment, a value of current supplied to the body-side terminal 102 may be controlled in a digital manner using an integrated circuit element (IC) or the like. In this case, instead of the two signals A and B, a single signal having a voltage linearly changed in accordance with a degree of the electric characteristics (including impedance and a current value) of the antenna-side terminal 101 may be transmitted from the antenna detection circuit 110 to the characteristic variable circuit.

Figure 4A:
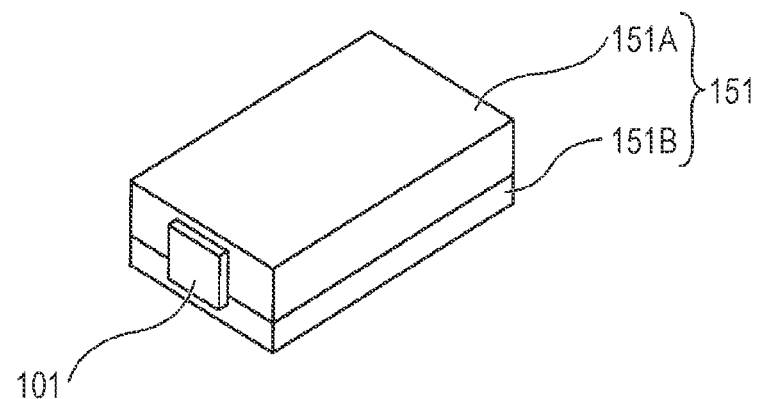
FIGS. 4A and 4B are diagrams illustrating a configuration of the amplifier module.
Figure 4B:
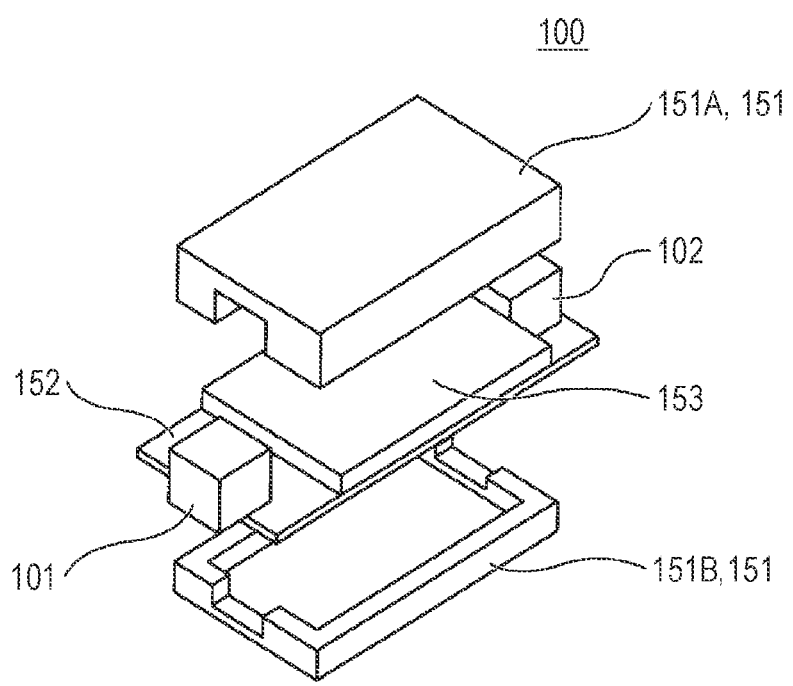

FIGS. 4A and 4B are diagrams illustrating a configuration of the amplifier module 100. FIG. 4A illustrates an assembled state and FIG. 4B illustrates an exploded state.

The amplifier module 100 includes a housing 151 (151A and 151B), a circuit substrate 152, a metal cover 153, the antenna-side terminal 101, and the body-side terminal 102.

The housing 151 is made of resin and may be divided into housings 151A and 151B. Predetermined electronic components that constitute the branch circuit 103, the BPF 104, the antenna detection circuit 110, the LNA 121, the PA 122, the switch circuits 123 and 124, the attenuator 125, the directional coupler 131, the signal detection circuit 132, the comparator 133, the inverter 134, the branch circuit 141, the DCDC converter 142, the switch circuit 143, and the LDO 144 that are illustrated in FIG. 2 are implemented on the circuit substrate 152. An upper surface in FIG. 4B is a mounting surface.

The metal cover 153 overlaps on the circuit substrate 152 so as to cover the mounting surface of the circuit substrate 152. The implement surface of the circuit substrate 152 is covered by the metal cover 153 so that noise emission of noise from the circuit substrate 152 to an outside is suppressed and intrusion of noise from the outside is suppressed.

The amplifier module 100 is assembled such that a circuit substrate 152 including predetermined electronic components implemented thereon and a metal cover 153 are accommodated between the housings 151A and 151B and the housings 151A and 151B sandwich the antenna-side terminal 101 and the body-side terminal 102 at opposite ends thereof as illustrated in FIGS. 4A and 4B. In this state, at least a portion of the antenna-side terminal 101 and a portion of the body-side terminal 102 are exposed from the housing 151.

Since the amplifier module 100 is configured as described above, a weight of the amplifier module 100 may be reduced and easiness of mounting of the amplifier module 100 on a vehicle may be improved. Specifically, since the housing 151 is made of resin, a weight of the amplifier module 100 may be easily reduced and members in a vehicle are hardly hurt when compared with a case where the housing 151 is made of metal. In addition, since the mounting surface of the circuit substrate 152 is covered by the metal cover 153, a minimum shield property may be ensured while a weight of the amplifier module 100 is reduced. Furthermore, since at least a portion of the antenna-side terminal 101 and a portion of the body-side terminal 102 are exposed from the housing 151, the cables 30A and 30B may be easily attached and detached.

As described above, in the amplifier module 100, the antenna detection circuit 110 detects the electric characteristics (including impedance and a current value) of the antenna-side terminal 101 corresponding to a connection state of the antenna 10, and the switch circuit 143 serving as a characteristic variable circuit changes the electric characteristics (including impedance and a current value) of the body-side terminal 102 based on the electric characteristics of the antenna-side terminal 101 detected by the antenna detection circuit 110.

Specifically, in the amplifier module 100 configured as described above, the antenna detection circuit 110 and the switch circuit 143 operate such that a current value in the body-side terminal 102 in the non-connection state is smallest, a current value in the body-side terminal 102 in the normal connection state is second smallest, and a current value in the body-side terminal 102 in the short-circuited state is largest. This tendency is the same as that of the current values in the antenna-side terminal 101 in the normal connection state, the non-connection state, and the short-circuited state.

Furthermore, according to the amplifier module 100 of this configuration, the antenna detection circuit 110 and the switch circuit 143 operate such that impedance of the body-side terminal 102 in the non-connection state is largest, impedance in the body-side terminal 102 in the normal connection state is second highest, and impedance in the body-side terminal 102 in the short-circuited state is lowest. This tendency is the same as that of the impedance in the antenna-side terminal 101 in the normal connection state, the non-connection state, and the short-circuited state.

Therefore, the body unit 20 may determine a connection state of the antenna 10 (the normal connection state, the non-connection state, and the short-circuited state) based on the electric characteristics of the body-side terminal 102 of the amplifier module 100 similarly to the case where the amplifier module 100 is not used.

Accordingly, the amplifier module 100 configured such that the body unit 20 may detect a connection state of the antenna 10 even when the amplifier module 100 is disposed between the wireless communication antenna 10 and the body unit 20 of the wireless communication apparatus may be provided.

The amplifier module 100 is a device that may be inserted in accordance with a degree of a signal loss that occurs in a cable between the antenna 10 and the body unit 20 without changing the antenna 10 and the body unit 20.

For example, when the antenna 10 and the body unit 20 are used in common in different types of vehicle that have different sizes and different body forms, the amplifier module 100 may be inserted where appropriate in accordance with a degree of a signal loss that occurs in a cable connecting the antenna 10 and the body unit 20 in a design step of the vehicle 1.

Therefore, the antenna 10 and the body unit 20 may be used in common in the plurality of types of vehicle.

Note that the mode in which the antenna 10 and the body unit 20 are connected to the amplifier module 100 through the cables 30A and 30B, respectively, is described above. However, the cable 30A and/or the cable 30B may be integrally connected to the amplifier module 100.

Although an exemplary embodiment of the amplifier module according to the present invention has been described hereinabove, the present invention is not limited to the embodiment disclosed in detail, and various modifications and changes may be made without departing from claims.

What is claimed is:

1. An amplifier module that is disposed between a wireless communication antenna and a body unit of a wireless communication apparatus and that is connected to the antenna and the body unit through a wiring member, the amplifier module comprising:
   an antenna-side terminal connected to the antenna;
   a body-side terminal connected to the body unit;
   an amplification circuit disposed between the antenna-side terminal and the body-side terminal;
   an antenna detection circuit configured to detect electric characteristics of the antenna-side terminal; and
   a characteristic variable circuit configured to change electric characteristics of the body-side terminal based on the electric characteristics of the antenna-side terminal detected by the antenna detection circuit, wherein the amplification circuit includes a transmission amplifier, a reception amplifier, and a transmission/reception switch circuit, and
   the transmission/reception switch circuit performs switching between a transmission connection state in which the transmission amplifier is connected between the antenna-side terminal and the body-side terminal at a time of signal transmission and a reception connection state in which the reception amplifier is connected between the antenna-side terminal and the body-side terminal at a time of signal reception.

2. The amplifier module according to claim 1, wherein
   the antenna detection circuit comprises a current detection circuit configured to detect a current value of the antenna-side terminal, and
   the characteristic variable circuit comprises a current restriction circuit configured to restrict a current value in the body-side terminal based on the current value in the antenna-side terminal detected by the antenna detection circuit.

3. The amplifier module according to claim 1, wherein
   the antenna detection circuit comprises an impedance detection circuit configured to detect impedance of the antenna-side terminal, and
   the characteristic variable circuit comprises an impedance variable circuit configured to change impedance of the body-side terminal based on the impedance of the antenna-side terminal detected by the antenna detection circuit.

4. The amplifier module according to claim 1, further comprising:
   a directional coupler connected between the body-side terminal and the amplification circuit and configured to receive a portion of a transmission signal transmitted from the body-side terminal at a time of signal transmission; and
   a switch signal output unit configured to output a switch signal for performing switching between the transmission connection state and the reception connection state of the transmission/reception switch circuit, wherein
   the switch signal output unit outputs the switch signal in response to a signal output from the directional coupler.

5. The amplifier module according to claim 1, wherein
   the characteristic variable circuit includes:
   a first switch element connected between the body-side terminal and a power source terminal of the amplification circuit, and
   a second switch element connected between the body-side terminal and a reference potential point, and
   when the electric characteristics of the antenna-side terminal detected by the antenna detection circuit indicate a state in which the antenna is normally connected to the antenna-side terminal, the first switch element is closed and the second switch element is opened.

6. The amplifier module according to claim 5, wherein
   when the electric characteristics of the antenna-side terminal detected by the antenna detection circuit indicate a state in which the antenna is not connected to the antenna-side terminal, the first switch element and the second switch element are opened.

7. The amplifier module according to claim 5, wherein
   the characteristic variable circuit further includes:
   a resistance portion for current restriction connected between the reference potential point and the second switch element, and
   when the electric characteristics of the antenna-side terminal detected by the antenna detection circuit indicate a state of short-circuit between the antenna-side terminal and the reference potential point, the first switch element is opened and the second switch element is closed.

8. The amplifier module according to claim 1, further comprising:
a circuit substrate on which the amplification circuit, the antenna detection circuit, and the characteristic variable circuit are disposed;
a metal cover that covers a mounting surface of the circuit substrate; and
a resin housing that accommodates the circuit substrate and the metal cover and expose at least a portion of the antenna-side terminal and a portion of the body-side terminal.

9. The amplifier module according to claim 1, wherein the amplifier module is disposed in a position near the antenna relative to a point in which a distance from the antenna and a distance from the body unit are equal to each other in a path where the wiring member is disposed between the antenna and the body unit.

10. An amplifier module that is disposed between a wireless communication antenna and a body unit of a wireless communication apparatus and that is connected to the antenna and the body unit through a wiring member, the amplifier module comprising:
an antenna-side terminal connected to the antenna;
a body-side terminal connected to the body unit;
an amplification circuit disposed between the antenna-side terminal and the body-side terminal;
an antenna detection circuit configured to detect electric characteristics of the antenna-side terminal; and
a characteristic variable circuit configured to change electric characteristics of the body-side terminal based on the electric characteristics of the antenna-side terminal detected by the antenna detection circuit, wherein
the characteristic variable circuit includes:
a first switch element connected between the body-side terminal and a power source terminal of the amplification circuit, and
a second switch element connected between the body-side terminal and a reference potential point, and
when the electric characteristics of the antenna-side terminal detected by the antenna detection circuit indicate a state in which the antenna is normally connected to the antenna-side terminal, the first switch element is closed and the second switch element is opened.

11. The amplifier module according to claim 10, wherein the antenna detection circuit comprises a current detection circuit configured to detect a current value of the antenna-side terminal, and
the characteristic variable circuit comprises a current restriction circuit configured to restrict a current value in the body-side terminal based on the current value in the antenna-side terminal detected by the antenna detection circuit.

12. The amplifier module according to claim 10, wherein the antenna detection circuit comprises an impedance detection circuit configured to detect impedance of the antenna-side terminal, and
the characteristic variable circuit comprises an impedance variable circuit configured to change impedance of the body-side terminal based on the impedance of the antenna-side terminal detected by the antenna detection circuit.

13. The amplifier module according to claim 10, further comprising:
a directional coupler connected between the body-side terminal and the amplification circuit and configured to receive a portion of a transmission signal transmitted from the body-side terminal at a time of signal transmission; and
a switch signal output unit configured to output a switch signal for performing switching between the transmission connection state and the reception connection state of the transmission/reception switch circuit, wherein
the switch signal output unit outputs the switch signal in response to a signal output from the directional coupler.

14. The amplifier module according to claim 10, wherein the characteristic variable circuit further includes:
a resistance portion for current restriction connected between the reference potential point and the second switch element, and
when the electric characteristics of the antenna-side terminal detected by the antenna detection circuit indicate a state of short-circuit between the antenna-side terminal and the reference potential point, the first switch element is opened and the second switch element is closed.

15. The amplifier module according to claim 10, further comprising:
a circuit substrate on which the amplification circuit, the antenna detection circuit, and the characteristic variable circuit are disposed;
a metal cover that covers a mounting surface of the circuit substrate; and
a resin housing that accommodates the circuit substrate and the metal cover and expose at least a portion of the antenna-side terminal and a portion of the body-side terminal.

16. The amplifier module according to claim 10, wherein the amplifier module is disposed in a position near the antenna relative to a point in which a distance from the antenna and a distance from the body unit are equal to each other in a path where the wiring member is disposed between the antenna and the body unit.

* * * * *